April 26, 1932.   J. J. BARRY   1,855,467
APPARATUS FOR FREEZING FOODSTUFFS
Filed May 23, 1928   3 Sheets-Sheet 1
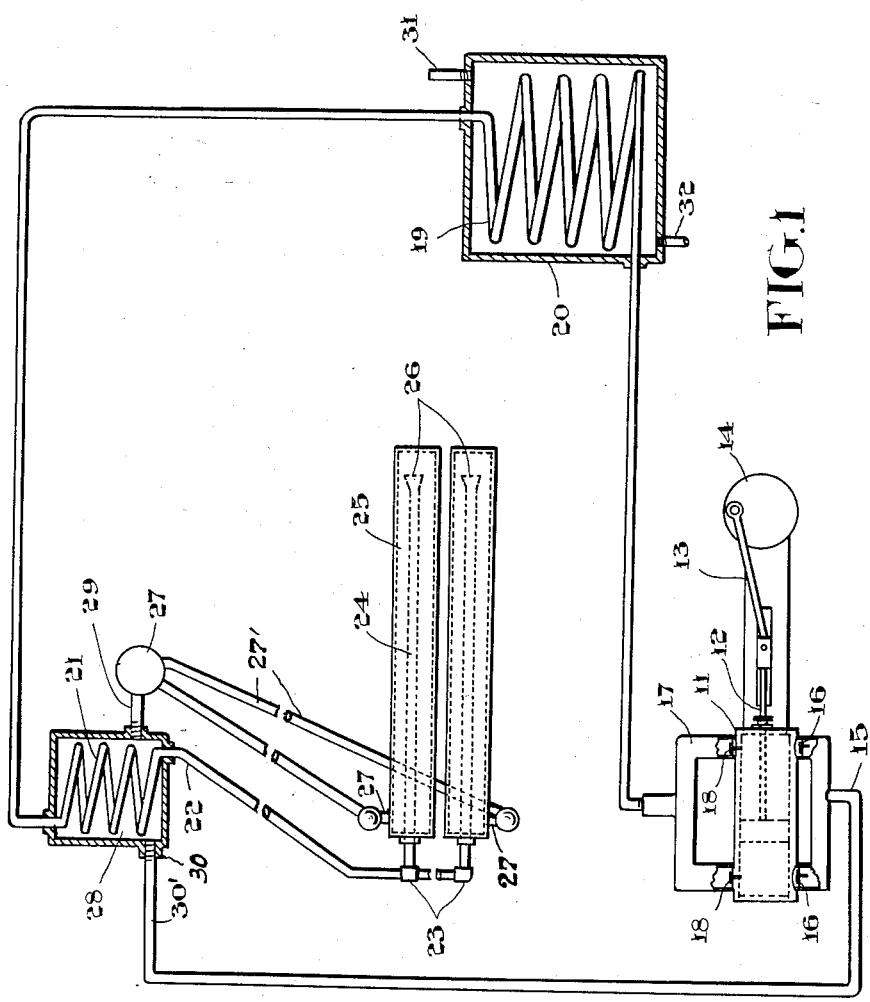
INVENTOR
JAMES. J. BARRY
BY *Fetherstonhaugh & Co*
ATTORNEYS April 26, 1932. J. J. BARRY 1,855,467
APPARATUS FOR FREEZING FOODSTUFFS
Filed May 23, 1928. 3 Sheets-Sheet 2
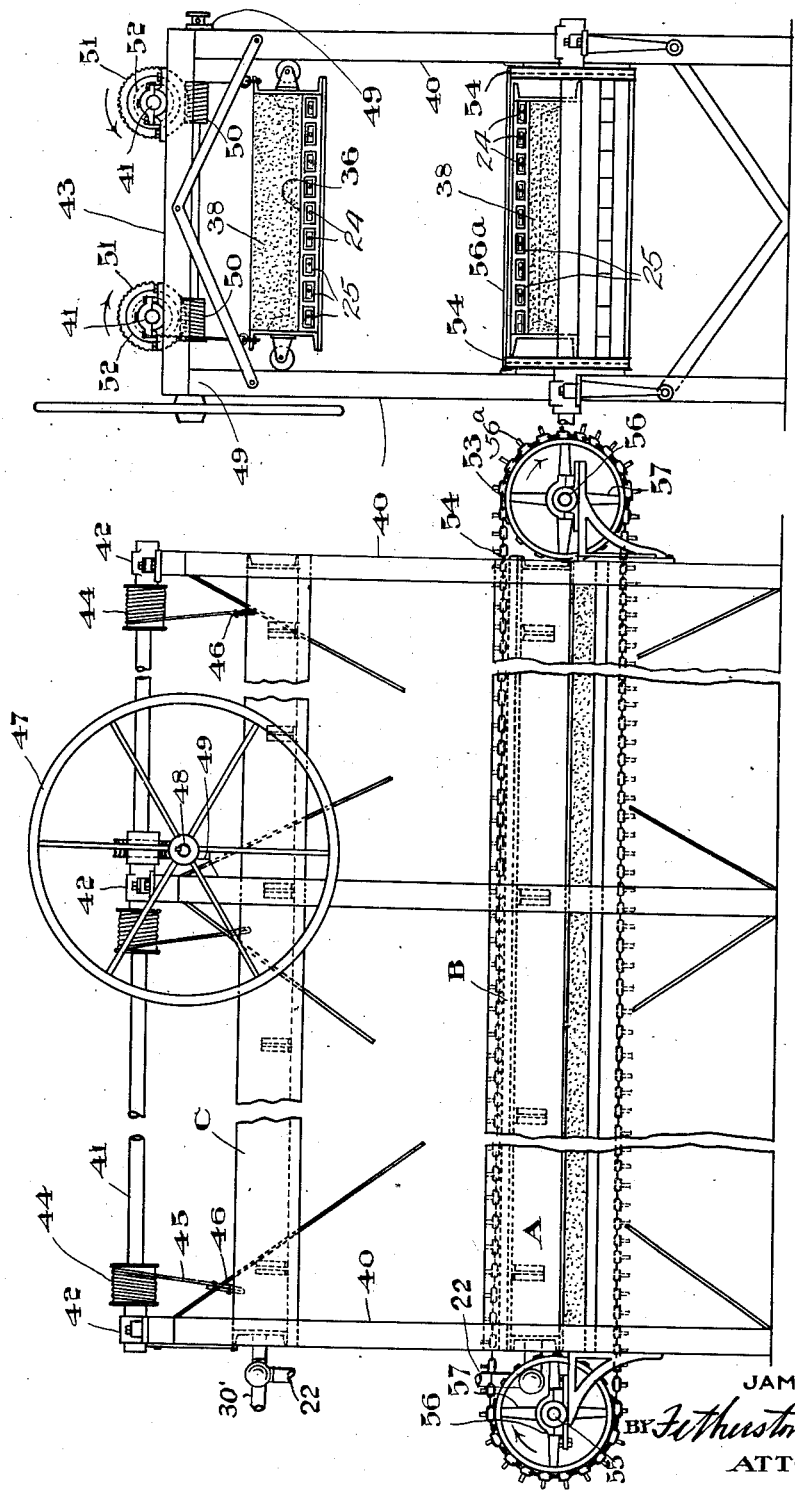
INVENTOR
JAMES J. BARRY
BY Fetherstonhaugh & Co
ATTORNEYS April 26, 1932.  J. J. BARRY  1,855,467
APPARATUS FOR FREEZING FOODSTUFFS
Filed May 23, 1928  3 Sheets-Sheet 3
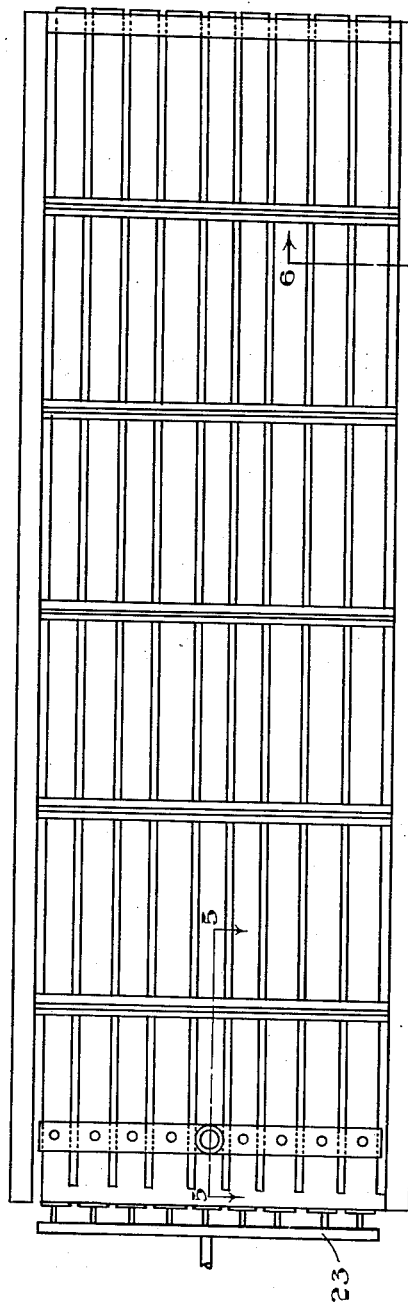
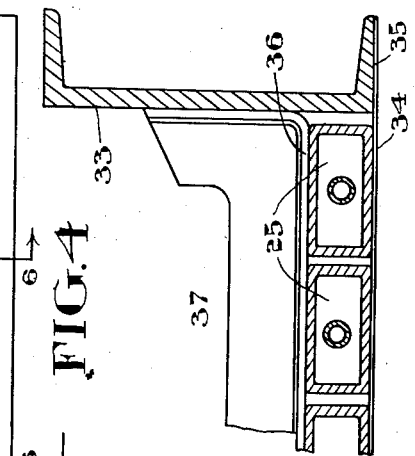
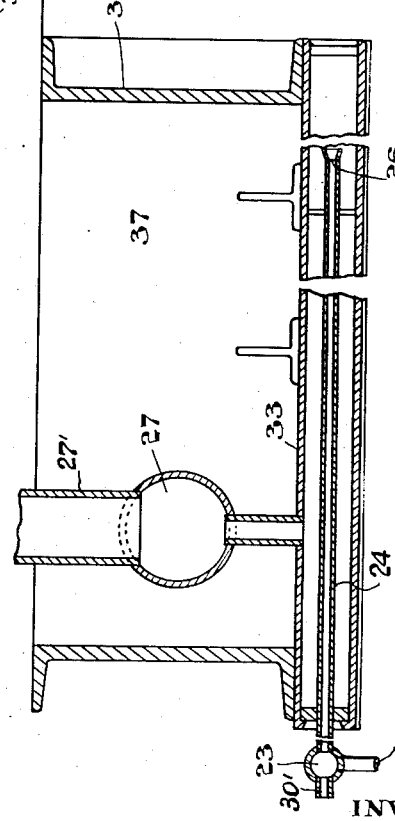
INVENTOR
JAMES J. BARRY
BY *Fetherstonhaugh & Co.*
ATTORNEYS Patented Apr. 26, 1932

1,855,467

UNITED STATES PATENT OFFICE

JAMES J. BARRY, OF DARTMOUTH, NOVA SCOTIA, CANADA, ASSIGNOR TO MARITIME FISH CORPORATION LIMITED, OF MONTREAL, QUEBEC, CANADA

APPARATUS FOR FREEZING FOODSTUFFS

Application filed May 23, 1928. Serial No. 280,022.

This invention relates to improvements in apparatus for preserving perishable goods such as fish, meat, and other foodstuffs, and the object of the invention is to provide a simple and economically operated apparatus for freezing foodstuffs under very low temperature conditions.

Another object is to provide a simple economical system for circulating low temperature gases with the minimum of loss in a food preserving machine.

According to my invention I provide a system in which carbon dioxide, nitrous oxide, ethane, or such like gases which have a low boiling point are circulated through a system in which the gas is first compressed and passed through a condenser and then expanded to form dry snow or ice within a chamber which is submitted to a heat transferring operation to re-act on the snow or ice so that it is withdrawn from the chamber in the form of a gas. The gas in circulation is withdrawn by suction from the chamber and the gas before it enters the suction side of the compresser is used to precool the gas being forced into the chamber. The foodstuffs which are to be frozen are placed between a pair of enclosed chambers which are movable toward or away from one another. The foodstuffs are frozen by their proximity to the low temperature chambers.

In the drawings which illustrate my invention:—

Figure 1 is a diagrammatic illustration of a refrigerating gas circulating system made according to my invention.

Figure 2 is a part side elevation of my improved freezing machine.

Figure 3 is an end elevation of the machine shown in Figure 2.

Figure 4 is a plan view of my improved freezing chambers.

Figure 5 is an enlarged part sectional side elevation of one of the chambers shown in Figure 4 and taken on the line 5—5 Figure 4.

Figure 6 is an enlarged part end elevation of the freezing chambers taken on the line 6—6 Figure 4.

Referring more particularly to the drawings. 11 designates a gas compressor, the piston rod 12 of which is connected to one end of a connecting rod 13, the other end of which is pivotally attached to a crank disc 14 rotated by any suitable means. The inlet pipe 15 has suitable valves 16 which open on the suction stroke and closes on the compression stroke, while the outlet pipe 17 has valves 18 which open on the compression stroke and close on the suction stroke. The discharge or outlet pipe is connected to a coil 19 within a condenser 20. The outlet end of the coil is connected to a precooling coil 21, within a precooling chamber. The outlet end of the coil 21 is connected by flexible pipes 22 to headers 23 which supply carbon dioxide gas under pressure through suitable pipes 24 into upper and lower sets of expansion chambers 25. The discharge ends of the pipes 24 are preferably flared as indicated at 26. The gas expands within the chambers and forms what is known as "dry ice" or "dry snow", which when subjected to heat will return to gas and flow into the headers 27 and from thence through flexible pipes 27' to a header 27a which is connected to a precooling chamber 28 by means of the pipe 29. The outlet 30 from the precooling chamber is connected by a pipe 30' to the suction side of the compressor. It will be seen that the gas after being compressed is subjected to a precooling stage before it passes into the chambers, and the cooling medium used is the discharge gases from the chambers. The condenser has a condensing fluid inlet 31 and an outlet 32, and circulation of the said fluid through the condenser may be maintained by a pump or such like means (not shown).

In Figures 4, 5 and 6, I have shown my preferred form of expansion chambers. The chambers 25 of each set are mounted in a frame 33 built of structural steel sections, and are preferably made of rectangular or D-shaped pipes. The pipes are secured to contact plates 34 which are secured to the side members 35 of the frames, which extend beyond the faces 36 of the chambers forming an enclosed space 37 which may be filled with suitable insulation 38, such as cork. The inlet header 23 for one set of chambers is shown and each chamber is provided with an inlet pipe 24. The outlet pipes 29 from each chamber are connected to a common outlet header 27. The preferred manner of mounting these chambers is shown in Figures 2 and 3. Two chamber supporting frames are shown, one movable and one fixed. The fixed frame designated A, is secured to suitable guiding members 40 with its contact plate B facing upwardly. The guiding members are suitably braced by means of the bars 41. The other or movable frame C is slidably mounted above the fixed frame with its contact plate D facing downwardly. Secured to shafts 41 rotatably mounted in suitable bearings 42, secured to the tying members 43 of the guiding members, are the rope drums 44. Each drum is provided with a rope 45, one end of which is secured to the drum and the end 46 is secured by any suitable means to the movable frame. The shafts are rotated by any suitable means, such as the hand wheel 47 which is secured to a spindle 48 rotatably mounted in suitable bearings 49, and provided with worms 50 which engage with the teeth 51 of worm wheels 52 secured to the shafts 41. The shafts are rotated to control the movement of the movable frame towards or away from the fixed frame. The foodstuffs to be frozen are carried on the endless conveyors 53 which consist of a pair of endless chains 54 passing over chain sprocket wheels 57. The sprocket wheels 57 are secured to shafts 55 rotatably mounted on bearings 56 secured to the end guide members. One of said shafts 55 may be driven from any suitable driving medium (not shown). The chains are connected together by means of wooden bars 56ª which pass over and in proximity to the contact plate of the fixed frame. The foodstuffs are laid on the wooden slats or bars.

The operation of the device is as follows:— The foodstuff to be preserved or frozen is mounted on the conveyor. The carbon dioxide gas is circulated by means of the compressor. The gas is first subjected to a cooling action in passing through suitable pipes in a condenser and is then subjected to a further cooling action by passing the coils of the precooler, before it is fed into the chambers, through venturi outlets. The gas in being discharged into the chambers expands very rapidly and forms "dry ice" or carbon dioxide snow, which is of very low temperature. The movable frame is allowed to drop towards the foodstuffs and the heat from the fish is transferred to the contact plates which, in turn, re-acts on the snow in the chambers to raise it in temperature and this raising of the temperature within the chamber turns the snow into its original form, carbon dioxide gas of low temperature. This discharge is fed into the pre-cooling chamber and assists in cooling the gas passing through the coils therein. The gas is then withdrawn to the suction side of the compressor. The temperature of the contact plates is preferably kept at a temperature of about $-70°$ F,. so that the foodstuffs which are brought in proximity thereto are rapidly frozen. The conveyor belt assists in feeding the machine rapidly and also prevents the foodstuffs from adhering to the contact plates. In the drawings the liquid inlet tubes for the chambers are positioned to discharge the liquid at one end thereof, and the outlet pipes are positioned at the other end to obtain the maximum benefit from the expanding gases.

The devices shown are only illustrative of parts of a machine which may be used in the operation of my improved method of freezing foodstuffs and it will be readily understood that modifications may be made in the various elements of the machine without departing from the spirit of the invention.

The preferred gas used is carbon dioxide, but any of the well known volatile gases, such as nitrous oxide and ethane, having a low boiling temperature, may be used. The method is very simple in its operation and it will be seen that the foodstuffs are rapidly frozen by indirect heat transfer. The system of circulation is continuous so that gas losses are reduced to a minimum.

Having thus described my invention, what I claim is:—

Apparatus for freezing foodstuff comprising upper and lower expansion chambers adapted to receive the foodstuff therebetween, a compressor, a condenser having its inlet connected to the discharge side of the compressor and having its outlet connected to said chambers, a pre-cooling chamber surrounding a portion of the last mentioned connection, said chamber having an inlet connected to the expansion chambers and an outlet connected to the suction side of the compressor and means for moving the upper chambers relative to the lower chambers.

In witness whereof, I have hereunto set my hand.

JAMES J. BARRY.